(12) United States Patent
Harrer et al.

(10) Patent No.: US 10,812,463 B2
(45) Date of Patent: Oct. 20, 2020

(54) SECURE ACCESS TO AN ENTERPRISE COMPUTING ENVIRONMENT

(71) Applicant: International Business Machines Corporation, Armonk, NY (US)

(72) Inventors: Stefan Harrer, Victoria (AU); Laurence Plant, Victoria (AU); Josef Reisinger, Bornheim (DE)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 15/835,727

(22) Filed: Dec. 8, 2017

(65) Prior Publication Data
US 2019/0182231 A1    Jun. 13, 2019

(51) Int. Cl.
| | | |
|---|---|---|
| *G06F 21/62* | (2013.01) | |
| *H04L 29/06* | (2006.01) | |
| *G06F 21/33* | (2013.01) | |
| *H04L 9/32* | (2006.01) | |
| *H04L 9/08* | (2006.01) | |
| *G06F 21/85* | (2013.01) | |
| *G06N 3/02* | (2006.01) | |
| *H04L 9/06* | (2006.01) | |

(52) U.S. Cl.
CPC ........ *H04L 63/0807* (2013.01); *G06F 21/335* (2013.01); *G06F 21/62* (2013.01); *G06F 21/85* (2013.01); *H04L 9/0894* (2013.01); *H04L 9/3239* (2013.01); *H04L 9/3297* (2013.01); *H04L 63/029* (2013.01); *G06F 2221/2139* (2013.01); *G06N 3/02* (2013.01); *H04L 9/0637* (2013.01); *H04L 2209/38* (2013.01)

(58) Field of Classification Search
CPC ........ G06F 21/36; G06F 21/85; G06F 21/335; G06F 21/62; G06F 2221/2139; H04L 63/0807; H04L 9/3297; H04L 9/3239; H04L 9/0894; H04L 63/029; H04L 2209/38; H04L 9/0637; G06N 3/02
See application file for complete search history.

(56) References Cited

U.S. PATENT DOCUMENTS

| | | | |
|---|---|---|---|
| 8,392,975 B1 * | 3/2013 | Raghunath | G06F 16/58 726/7 |
| 9,319,395 B2 | 4/2016 | Forster et al. | |
| 9,537,824 B2 * | 1/2017 | Jungck | H04L 29/12066 |
| 2004/0034801 A1 * | 2/2004 | Jaeger | G06F 3/0481 726/6 |
| 2005/0140675 A1 * | 6/2005 | Billingsley | G06F 21/36 345/440 |
| 2005/0273848 A1 * | 12/2005 | Charles | H04L 63/0807 726/11 |

(Continued)

OTHER PUBLICATIONS

"Transport Access Control: Overview", obtained online from <https://www.blackridge.us/images/site/page-content/BlackRidge_TAC_Overview.pdf>, retrieved on Jun. 14, 2020 (Year: 2011).*

(Continued)

*Primary Examiner* — Farid Homayounmehr
*Assistant Examiner* — Zhimei Zhu
(74) *Attorney, Agent, or Firm* — Brown & Michaels, PC; Christopher Pignato

(57) ABSTRACT

Remote access of a service provider to a secure enterprise computing environment through a firewall through the use of tokens.

19 Claims, 5 Drawing Sheets

(56) References Cited

U.S. PATENT DOCUMENTS

| | | | | |
|---|---|---|---|---|
| 2006/0251101 A1* | 11/2006 | Zhang | H04L 63/029 | 370/437 |
| 2007/0101414 A1* | 5/2007 | Wing | H04L 29/06027 | 726/5 |
| 2010/0183151 A1* | 7/2010 | Wing | H04L 63/029 | 380/257 |
| 2010/0257202 A1* | 10/2010 | Szummer | G06K 9/6257 | 707/771 |
| 2011/0321148 A1* | 12/2011 | Gluck | H04L 63/0209 | 726/9 |
| 2012/0260328 A1* | 10/2012 | Ravindranath | H04L 61/2575 | 726/9 |
| 2013/0097697 A1* | 4/2013 | Zhu | G06F 21/31 | 726/18 |
| 2014/0149177 A1* | 5/2014 | Frank | G06Q 10/06 | 705/7.29 |
| 2015/0113588 A1* | 4/2015 | Wing | H04L 63/0227 | 726/1 |
| 2015/0120951 A1* | 4/2015 | Wilson | H04L 43/08 | 709/229 |
| 2016/0072816 A1* | 3/2016 | Makhervaks | H04L 63/1458 | 726/13 |
| 2016/0239654 A1* | 8/2016 | Johri | G06F 21/36 | |
| 2016/0241596 A1* | 8/2016 | Overby, Jr. | H04L 63/20 | |
| 2016/0337314 A1* | 11/2016 | Yu | H04L 63/083 | |
| 2017/0006034 A1* | 1/2017 | Link, II | H04L 61/2592 | |
| 2017/0149560 A1* | 5/2017 | Shah | H04L 9/0637 | |
| 2017/0244672 A1* | 8/2017 | Shulman | H04L 12/4633 | |
| 2017/0366348 A1* | 12/2017 | Weimer | H04L 9/3239 | |
| 2018/0247063 A1* | 8/2018 | Li | H04L 9/083 | |
| 2018/0285979 A1* | 10/2018 | Chessell | G06Q 40/08 | |
| 2018/0336415 A1* | 11/2018 | Anorga | G06K 9/6267 | |
| 2018/0342036 A1* | 11/2018 | Zachary | G06Q 30/0265 | |
| 2018/0374062 A1* | 12/2018 | Hunter | G06Q 20/027 | |
| 2019/0128771 A1* | 5/2019 | Santarone | G01M 5/00 | |
| 2019/0156291 A1* | 5/2019 | Nayak | H04L 63/10 | |

OTHER PUBLICATIONS

Liu, C. "Investigating Network Security Through Firewall Utilities Case: Cisco ASA", Turku University of Applied Sciences, Bachelor's Thesis; 2017.

Lui et al. "SaaS Integration for Software Cloud", 2010 IEEE 3rd International Conference on Cloud Computing (CLOUD); Jul. 2010.

* cited by examiner

SECURE ACCESS TO AN ENTERPRISE COMPUTING ENVIRONMENT

BACKGROUND

The present invention relates to secure, remote access of a customer's computing environment by a service provider, and more specifically to remotely accessing a secure enterprise computing environment through a firewall through the use of tokens.

Services provided to the market by Communications and Media Service Providers include communications, video streaming and video conferencing. Service providers run these services in a service provider environment or domain which can include data centers and networks. As the available computing power in the customer's or consumer's enterprise environment or domain increases over time, the optimal place to run or execute some services is in the customer domain, otherwise known as the enterprise computing environment or customer premise environment.

An example of such a service is a live video broadcast system. Five hundred employees in a building trying to watch a live broadcast of an employee town hall meeting will each try to establish their own dedicated video stream of the event into their building and to their desktops, which is likely to congest the network, incur cost, impact bandwidth and impact end user experience. A better approach is to have only one live video stream enter the building, and to use a multicast video service inside the enterprise computing domain to distribute the video to each viewer. This requires the video service provider to deploy a multicast service into the customer domain.

Other examples including secure Software as a Service (SaaS), solutions where the customer wants to use a SaaS solution but for security reasons wants to keep all data and the SaaS workload in their environment or domain.

Currently there is no common industry approach to enabling Service Providers to access the enterprise computing environment. Opening up a customer environment for remote access by a Service Provider to remotely install, run, monitor and maintain workloads represents a security risk. Customer firewalls have to be opened for use by the Service Provider and opening the ports makes the customer domain or enterprise computing environment vulnerable to attack.

A typical response to a request from a Service Provider for access to a customer domain is for the customer security team to refuse the request.

An alternate approach is for the Service Provider to deliver the service as an app to run on a consumer electronics device such as an Apple iOS or Google Android devices, and rely on the vendor app store to deliver the service. This approach has drawbacks, as the Service Provider and customer are beholden to the consumer electronics company, requires end user intervention to initiate the download and launch and maintain the service, and does not support delivery of services which do not run on consumer electronic devices. This approach also does not address services which are shared by multiple users in the customer domain, such as the live video broadcast and on-premise SAAS examples above.

Another approach is for the Service Provider to visit the customer site and install and provision the service and subsequently visit again on an ongoing basis to maintain the service. This has cost, complexity, time and effort establishing, training and running a field workforce.

A fourth approach is for the customer to open ports in their firewall for the Service Provider to use. The risk here is that malicious third parties are likely to scan and find the open port and launch an attack. While the impact of such an attack can be minimized through the customer deploying a layered enterprise network and zones, the optimal place for deploying the service may be in a secure zone and a customer will not want to make available a series of open ports through the firewalls that separate each zone.

SUMMARY

According to one embodiment of the present invention, a method of securely accessing a secure enterprise computing environment comprising a shared repository connected to a network through a firewall by a service provider environment comprising a shared repository is disclosed. The method comprising the steps of: the service provider environment sending a request to the shared repository to access the enterprise computing environment; the service provider environment receiving a service agreement from the enterprise computing environment specifying the requirements of accessing the enterprise computing environment and a token; the service provider environment adding predefined images to the token; the service provider environment storing a classifier for the predefined images inserted into the token created in the shared repository; the service provider environment embedding the token into internet protocol packets; and the service provider sending the internet protocol packets with the embedded tokens to the firewall of the enterprise environment according to the agreement.

According to another embodiment of the present invention, a computer program product for securely accessing a secure enterprise computing environment is disclosed. The secure enterprise computing environment comprising a shared repository connected to a network through a firewall by a service provider environment comprising a shared repository. The service provider environment and the secure enterprise computing environment each comprising a computer comprising at least one processor, one or more memories, one or more computer readable storage media, the computer program product comprising a computer readable storage medium having program instructions embodied therewith. The program instructions executable by the computer to perform a method comprising: sending, by the service provider environment, a request to the shared repository to access the enterprise computing environment; receiving, by the service provider environment, a service agreement from the enterprise computing environment specifying the requirements of accessing the enterprise computing environment and a token; adding, by the service provider environment, predefined images to the token; storing, by the service provider environment, a classifier for the predefined images inserted into the token created in the shared repository; embedding, by the service provider environment, the token into internet protocol packets; and sending, by the service provider environment, the internet protocol packets with the embedded tokens to the firewall of the enterprise environment according to the agreement.

According to another embodiment of the present invention, a computer system for securely accessing a secure enterprise computing environment is disclosed. The secure enterprise computing environment comprising a shared repository connected to a network through a firewall by a service provider environment comprising a shared repository, the service provider environment and the secure enterprise computing environment each comprising a computer comprising: at least one processor, one or more memories, one or more computer readable storage media having program instructions executable by the computer to perform the program instructions. The program instructions comprising: sending, by the service provider environment, a request to the shared repository to access the enterprise computing environment; receiving, by the service provider environment, a service agreement from the enterprise computing environment specifying the requirements of accessing the enterprise computing environment and a token; adding, by the service provider environment, predefined images to the token; storing, by the service provider environment, a classifier for the predefined images inserted into the token created in the shared repository; embedding, by the service provider environment, the token into internet protocol packets; and sending, by the service provider environment, the internet protocol packets with the embedded tokens to the firewall of the enterprise environment according to the agreement.

According to another embodiment of the present invention, a method of securely accessing a secure enterprise computing environment comprising a shared repository and a filter connected to a network through a firewall by a service provider environment comprising a shared repository is disclosed. The method comprising the steps of: the enterprise computing environment receiving a request in the shared repository from a service provider environment for access to the enterprise environment; the enterprise computing environment generating a service agreement and a token in response to the request and storing the service agreement in the shared repository; the enterprise computing environment receiving incoming internet protocol packets via the firewall; the enterprise computing environment obtaining a classifier for predefined images inserted into the token from the shared repository; the enterprise computing environment inspecting incoming internet protocol packets received from the firewall by: determining if the internet protocol packets contain a token; and for the packets containing a token, comparing the classifier to the token to determine whether the token includes the predefined images; the enterprise computing environment allowing incoming internet protocol packets which contain the token with the predefined images to pass into the enterprise computing environment from secure provider environment, granting access of the secure provider environment to the enterprise computing environment.

According to another embodiment of the present invention, a computer program product for securely accessing a secure enterprise computing environment comprising a shared repository and a filter connected to a network through a firewall by a service provider environment comprising a shared repository is disclosed. The service provider environment and the secure enterprise computing environment each comprising a computer comprising at least one processor, one or more memories, one or more computer readable storage media, the computer program product comprising a computer readable storage medium having program instructions embodied therewith. The program instructions executable by the computer to perform a method comprising: receiving, by the enterprise computing environment, a request in the shared repository from a service provider environment for access to the enterprise environment; generating, by the enterprise computing environment, a service agreement and a token in response to the request and storing the service agreement in the shared repository; receiving, by the enterprise computing environment, incoming internet protocol packets via the firewall; obtaining, by the enterprise computing environment, a classifier for predefined images inserted into the token from the shared repository; inspecting, by the enterprise computing environment, incoming internet protocol packets received from the firewall by: determining if the internet protocol packets contain a token; and for the packets containing a token, comparing the classifier to the token to determine whether the token includes the predefined images; allowing, by the enterprise computing environment, incoming internet protocol packets which contain the token with the predefined images to pass into the enterprise computing environment from secure provider environment, granting access of the secure provider environment to the enterprise computing environment.

According to another embodiment of the present invention, a computer system for securely accessing a secure enterprise computing environment comprising a shared repository and a filter connected to a network through a firewall by a service provider environment comprising a shared repository is disclosed. The service provider environment and the secure enterprise computing environment each comprising a computer comprising: at least one processor, one or more memories, one or more computer readable storage media having program instructions executable by the computer to perform the program instructions. The program instructions comprising: receiving, by the enterprise computing environment, a request in the shared repository from a service provider environment for access to the enterprise environment; generating, by the enterprise computing environment, a service agreement and a token in response to the request and storing the service agreement in the shared repository; receiving, by the enterprise computing environment, incoming internet protocol packets via the firewall; obtaining, by the enterprise computing environment, a classifier for predefined images inserted into the token from the shared repository; inspecting, by the enterprise computing environment, incoming internet protocol packets received from the firewall by: determining if the internet protocol packets contain a token; and for the packets containing a token, comparing the classifier to the token to determine whether the token includes the predefined images; allowing, by the enterprise computing environment, incoming internet protocol packets which contain the token with the predefined images to pass into the enterprise computing environment from secure provider environment, granting access of the secure provider environment to the enterprise computing environment.

DETAILED DESCRIPTION

Figure 1:
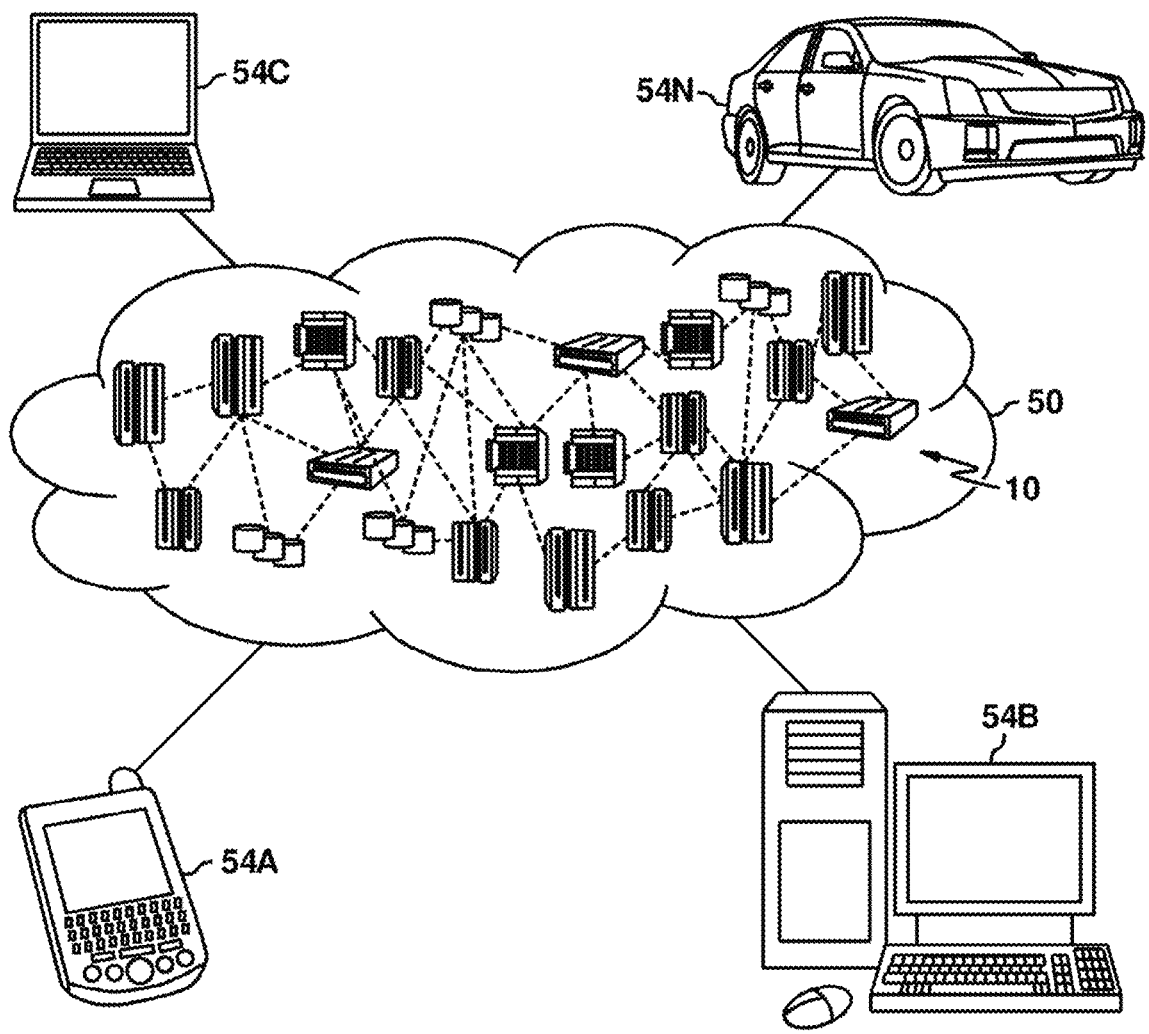
FIG. 1 depicts a cloud computing node according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
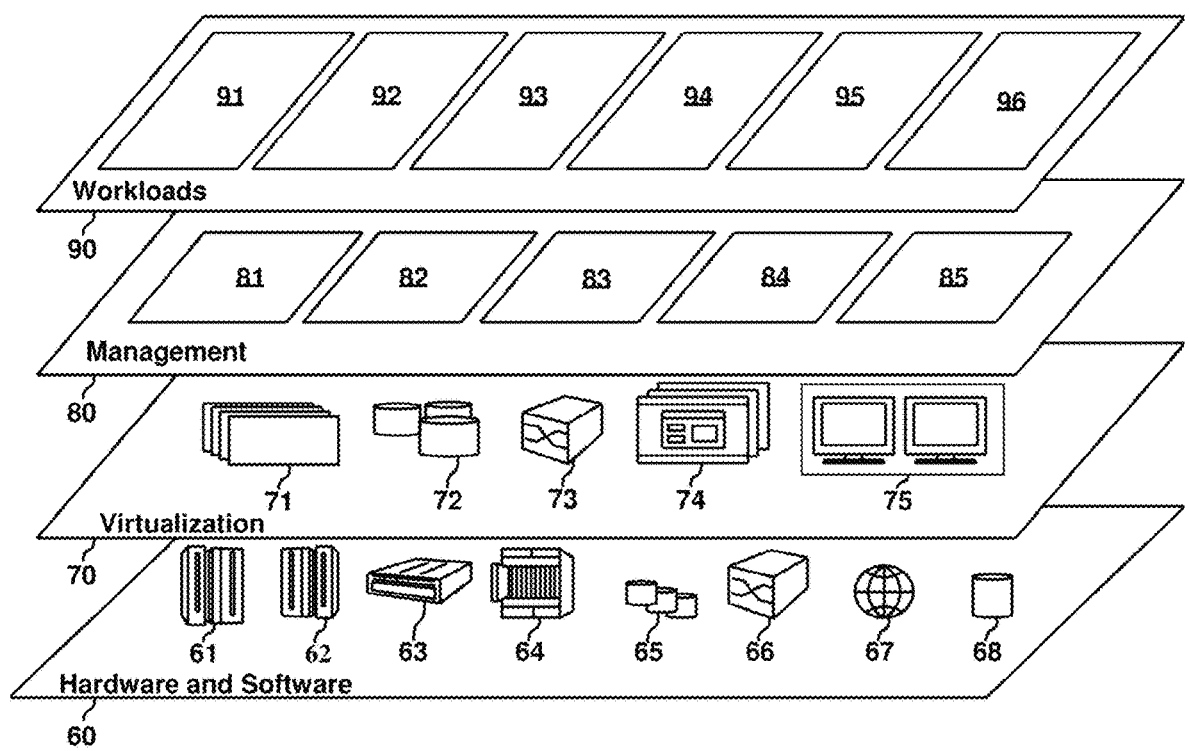
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security may additionally be provided and provides identity verification for cloud consumers and tasks, as well as protection for data and other resources.

User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
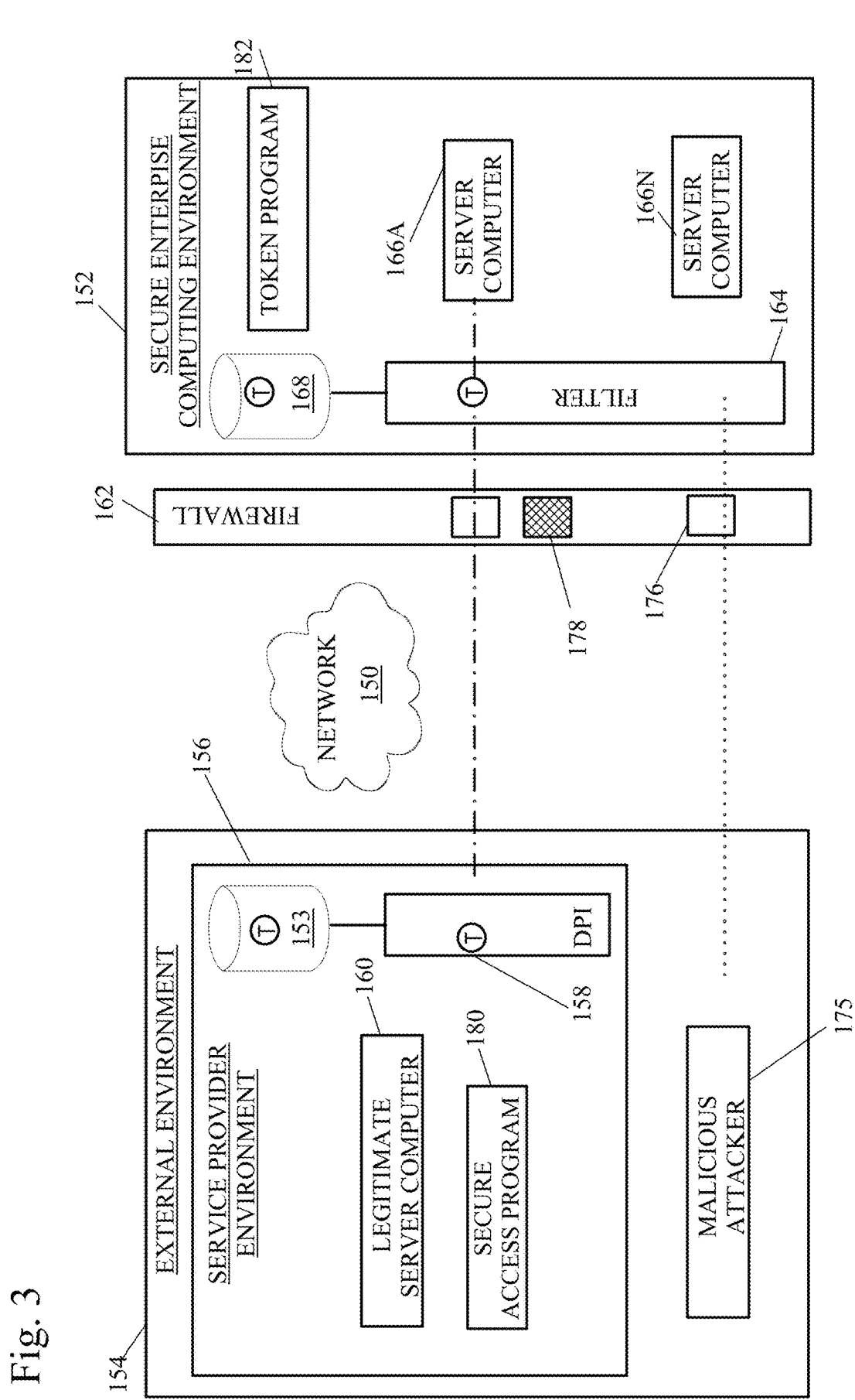
FIG. 3 shows a schematic of implementation of a method of securely accessing a secure enterprise computing environment.

FIG. 3 shows a schematic of implementation of a method of securely accessing a secure enterprise computing environment or domain.

An external environment 154 may include a service provider domain or environment 156. The service provider domain 156 may contain a server computer 160, deep packet inspection (DPI) 158 and a shared repository 153. The shared repository 153 stores any access tokens T and security agreements with enterprise computing environments or domains 152.

An interface (not shown) to the shared repository 153 and server computer 160 may be present and may accept commands and data entry from a user. The commands may be regarding requests to connect to the secure enterprise computing environment or domain 152. The interface can be, for example, a command line interface, a graphical user interface (GUI), a natural user interface (NUI) or a touch user interface (TUI). The service provider domain 156 can include a secure access program 180 which is incorporated into the shared repository 153, the server computer 160 or the DPI 158. The secure access program 180 can alter, read and sometimes set terms of an agreement between the service provider domain 156 and the enterprise computing domain 152. The secure access program 180 also works with the DPI 158 to fetch the token T from the shared repository 152 and insert the access token T into packets being routed to a firewall 162 of the enterprise computing domain 152. In one embodiment, the access token T includes a set of images.

The service provider domain 156 can be connected to a secure enterprise computing domain 152 via a network 150 and through a firewall 162. The firewall 162 contains a plurality of controllable ports 176, 178. The open ports 176 are indicated by blank squares in the figure and the closed ports 178 are crosshatched.

The secure enterprise computing environment or domain 152 includes at least one server computer 166a-166n, and a filter 164 connected to a repository 168 which is the same shared repository as repository 153 of the service provider environment 156. The secure enterprise computing domain 152 preferably includes a token program 182. The token program 182 can set terms of a security agreement between the service provider domain 156 and the enterprise computing domain 152. The token program 182 also generates access tokens, changes tokens, relays tokens to the shared repository 168 and can work with the filter 164 and firewall 162 to fetch tokens T from the shared repository 168 to compare to the incoming packets (shown as a dash-dot line). The filter 164 receives incoming packets via the firewall 162. The filter 164 preferably includes a neural network for image analytics.

The shared repository 168 of the secure enterprise computing domain 152 and shown as repository 153 of the service provider domain 156 represent shared databases between the two environments or domains for recording and enforcing an agreement between the customer and the service provider. The shared repository 168 may include blockchain, which is a continuously growing list of records, called blocks, which are linked and secured using cryptography. Each block typically contains a hash pointer as a link to a previous block, a timestamp and transaction data. Blockchains are inherently resistant to modification of the data. A blockchain can serve as distributed or shared ledger that can record transactions between two parties (enterprise and service provider) efficiently and in a verifiable and permanent way.

The term "agreement" herein refers to agreed terms for access of the service provider to the enterprise computing domain 152. The agreement may include, but is not limited to: time of access, token size, number of images associated with a token, object composition for tokens, access ports of the firewall, number of concurrent access ports which can be used, and number of times an access token T can be used by the service provider. The agreement is preferably encrypted.

To keep overheads down, in its simplest form the access token T need only be small in size, a few bytes injected into each IP packet (shown by the dash-dot line) passing from the service provider domain 156 to the enterprise computing domain 152, with those few bytes removed by the filter 164 and not transparent to the application or server computer 166a, for example in a similar way to watermarks in content.

The maximum IP V4 packet size is 64 KB and for IPV6 maximum packet size is 4 GB, hence as packet size increases it becomes feasible to use larger tokens, which makes this method more difficult to crack.

With use of image-based tokens, the smallest number of bytes needed for the token T (where the token is a compressed image) is approx. 7 MB, estimated as follows:
  token consists of a total of up to 100 compressed JPEGs
    assume original images are ~800 KB/image;
  JPEG can compress down to ¼ of original size which is
    around 200 KB/image×100 images=20 MB token size;
    and
  reducing the token to comprise only 30 images cuts token
    size by a factor of three giving a total token size of ~7
    MB.

The access tokens T can change over time and even during a session. The change is securely relayed to the service provider domain 156 via blockchain.

In an embodiment of the present invention, service provider domain 156 and enterprise computing domain 152 secure access arrangements. These environments or domains use blockchain as a secure means for the service provider domain 156 and the enterprise computing domain 152 to record and facilitate execution of the agreement for the service provider 156 to access the secure enterprise computing domain 152 through the enterprise firewall 162.

Via the blockchain, the enterprise computing domain 152 provides the service provider domain 156 with a secure token T to be added to the IP packet traffic being sent by the service provider domain 156 to the enterprise computing domain 152.

The security agreement within the blockchain triggers a port 176 of the firewall 162 to be opened at an agreed time.

The filter 164, or firewall 162 of the enterprise computing domain 152, monitors and inspects the packets of all traffic arriving through the open port 176, checking to see if an access token T is embedded. Packets without the token (see dotted line), which may be sent by a malicious party 175, are rejected and those with the token T (see dash-dot line) are allowed to pass.

While the token T could be a simple code only a few bytes in size, under IPV6 where packet size is 4 GB, the token would be a set of embedded images and the token recognition system of the filter 164 or firewall 162, a neural net that analyses the images to confirm expected images are present.

The service provider domain 154, for example via the secure access program 180 inserts an individually pre-defined series of image objects into the IP packet and the filter/package inspection system in the enterprise computing domain 152 uses a neural network based classifier in the firewall 162 or filter 164 to detect whether these objects are contained in the token T.

For example, in the service agreements, the enterprise computing domain 152 may define the token size 100 images which are inserted into the IP packet. A 'verification key' of the filter 64 or firewall 162 of the enterprise computing domain 152 may be defined by fifty individual objects, X of which need to be detected, 150-X of which are just not be detected in imagery (i.e. dog, cup, balloon, horse etc. . . . ). A neural network classifier of the filter 64 or firewall 162, for example via the token program 82 of the enterprise computing domain 152 is trained to detect these fifty objects in the imagery data of the token T. The service provider domain 156 provides this neural network classifier to enterprise computing domain 152 via blockchain. The service provider domain 154 defines the object composition for a correct (agreed upon via the security agreement) token, i.e. which objects must not be represented in token imagery and which objects must be represented in token imagery and provides this 'key' to enterprise computing domain 152. The service provider domain 156 then composes token T from imagery data satisfying these criteria.

The enterprise computing domain 152 runs neural network classifier, for example via the token program 182 to verify token T. If the correct representation of objects in token imagery is detected then token T is verified. If incorrect representation of objects in token imagery is detected then token T is rejected.

Using neural networks for this security task has many advantages. For example, the neural networks for object detection in imagery can be built so that they practically only work (as in exhibit a pre-defined level of accuracy) on a specific imagery dataset. Thereby, specificity to a custom dataset can be optimized by increasing the size of the dataset, setting a high level of desired classification accuracy, and choosing a large number of individual classes to be detected. Essentially the service provider domain 56 can choose these parameters so that the designed classifier will only work on imagery from a specific imagery dataset which can be held confidential. This means that the service provider domain 56 can build an extremely strong verification key to underlie all its tokens by building a neural network classifier on a proprietary imagery dataset of its choosing. Furthermore, the neural network classifiers run in real time, so each enterprise computing domain 152 can inspect and verify tokens in real-time which provides maximum traffic speed, increasing the efficiency of the enterprise.

Additionally, the neural networks can run on mobile devices as well as on stationary compute units so tokens can be verified in real time at any point in the traffic pipeline. Token composition can be changed any time without effort to enhance network security, as the service provider domain 156 just needs to communicate the new token composition to enterprise computing domain 152 so that the verification read-out can be adjusted and the underlying neural network classifier stays unchanged.

Figure 4:
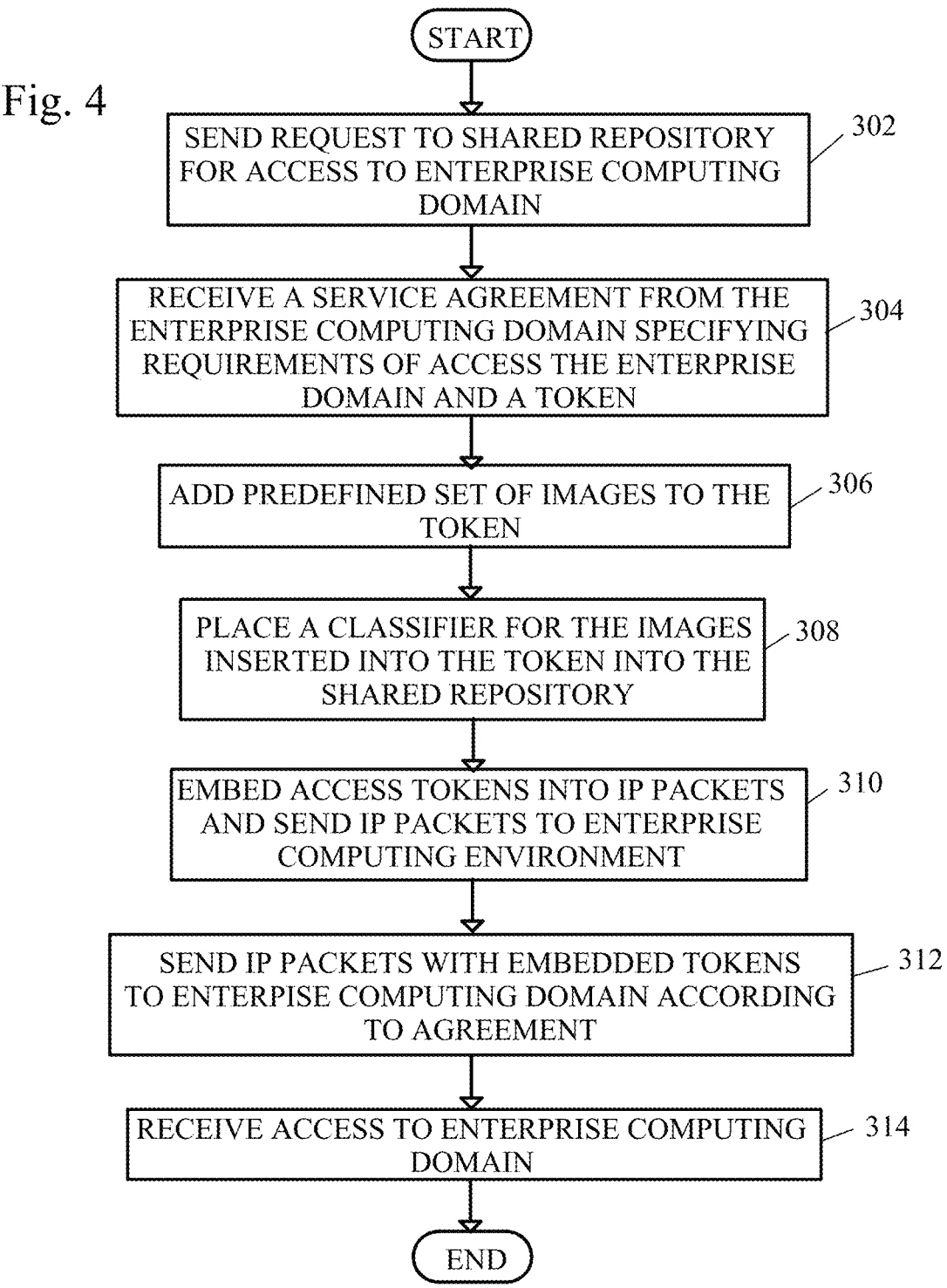
FIG. 4 shows a flowchart of a method of securely accessing a secure enterprise computing environment by a service provider environment.

FIG. 4 shows a flowchart of a method of securely accessing a secure enterprise computing domain by a service provider.

In a first step, the service provider domain sends a request to the shared repository to access the enterprise computing domain (step 302). The shared repository preferably includes blockchain.

The service provider domain receives a service agreement from the enterprise computing domain specifying the requirements of the accessing the enterprise computing domain and a token (step 304). The requirements include, but are not limited to time of access, token size, number of images associated with a token, object composition for tokens, access ports of the firewall, number of concurrent access ports which can be used, and number of times an access token T can be used by the service provider. The agreement is preferably encrypted.

The service provider domain adds predefined images to the token (step 306).

The service provider domain places a neural a neural network classifier regarding the images inserted into the token for the access token created in the blockchain (step 308). The classifier is a 'verification key' for the access token.

The service provider domain then embeds the access token into IP packets (step 310) and sends the IP packets with the embedded access tokens to the enterprise environment according to the agreement (step 312).

The service provider receives access to the enterprise computing domain (step 314) and the method ends.

Figure 5:
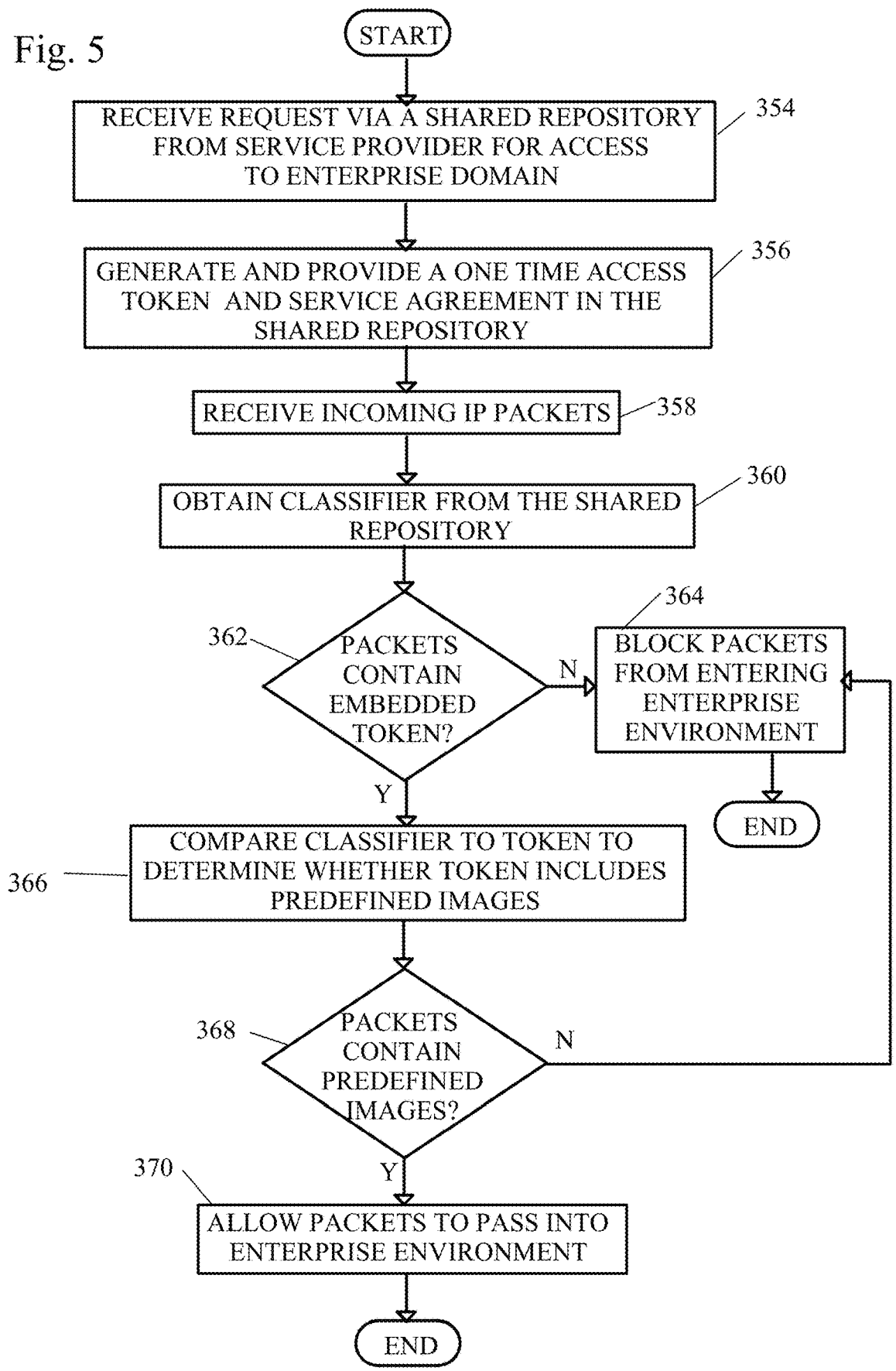
FIG. 5 shows a flowchart of a method of securing access to the secure enterprise computing environment.

FIG. 5 shows a flowchart of a method of securing access to the secure enterprise computing environment.

The enterprise computing domain receives request in the shared repository from a service provider domain for access to the enterprise computing domain (step 354).

The enterprise computing domain generates and provides a service agreement and a token in the shared repository (step 356) in response the request to grant access to the service provider domain.

The enterprise computing domain receives incoming IP packets (step 358).

The enterprise computing domain then obtains a classifier via the shared repository from the service provider domain (step 360). The classifier is preferably a neural network classifier.

If the incoming IP packets do not contain an embedded token (step 362), the packets are blocked from entering the enterprise computing domain (step 364) by the firewall and the method ends.

If the incoming IP packets contain an embedded token (step 362), a filter or firewall compare the neural network classifier to the token to determine whether the token includes the predefined images (step 366).

If the packets contain the appropriate embedded images within the access token (step 368), the packets are allowed to pass into the customer environment granting the service provider domain access to the enterprise computing domain (step 370) and the method ends.

If the packets do not contain the appropriate embedded images within the access token (step 368), the packets are prevented or blocked from entering the enterprise computing domain, denying access to the enterprise computing domain (step 364) and the method ends.

In an embodiment of the present invention, it will be recognized that the method of securing access between a service provider environment and an enterprise environment is secure, trusted, auditable access through at least one firewall, enabling the Service Provider to be approved to deliver packets into different secure zones of an enterprise environment. In an embodiment of the present invention, only the approved Service Provider has access through the firewall to the enterprise environment. Furthermore, the use of access tokens only known by the approved service provider and the enterprise environment to ensure only approved traffic crosses the firewall, and for those access tokens to be inserted at different layers of the network protocol stack.

By using the method of an embodiment of the present invention, enterprise can keep all data and workload within their own environment and therefore, workloads can be placed in the optimal domain, increasing the efficiency of the enterprise computing environment. Furthermore, the method allows a service provider domain to more easily and securely traverse layered enterprise networks in order to access data and function in the enterprise computing domain, without the enterprise having to expose the function and data on the internet as an application interface.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of securely accessing a secure enterprise computing environment connected to a network through a firewall by a service provider environment, with the secure enterprise computing environment and the service provider environment sharing a shared repository, the method comprising the steps of:
   the service provider environment sending a request to the shared repository to access the enterprise computing environment;
   the service provider environment receiving a service agreement from the enterprise computing environment specifying requirements of accessing the enterprise computing environment and a token, wherein the service agreement specifies restrictions of the token including a number of images associated with the token in a range of 30-100 images, token size, and object composition for tokens;
   the service provider environment adding predefined images to the token based on the service agreement;
   the service provider environment storing a classifier for the predefined images inserted into the token created, in the shared repository of the service provider environment and the secure enterprise computing environment;
   the service provider environment embedding the token into internet protocol packets; and
   the service provider sending the internet protocol packets with the embedded tokens to the firewall of the enterprise environment according to the service agreement.

2. The method of claim 1, wherein the shared repository includes blockchain.

3. The method of claim 1, wherein the service agreement includes at least one restriction selected from a group consisting of one or more of a combination of: a time of access by the enterprise computing environment by the service provider, access ports of the firewall, number of concurrent access ports of the firewall which can be used, and number of times a token can be used by the service provider.

4. The method of claim 1, wherein the classifier is a neural network classifier.

5. The method of claim 1, wherein the token is greater than 6 megabytes in size.

6. The method of claim 1, wherein the enterprise computing environment and the service provider environment are nodes of a cloud computing environment.

7. A method of securely accessing a secure enterprise computing environment comprising a filter connected to a network through a firewall by a service provider environment, with the secure enterprise computing environment and the service provider environment sharing a shared repository, the method comprising the steps of:
   the enterprise computing environment receiving a request in the shared repository from a service provider environment for access to the enterprise environment;
   the enterprise computing environment generating a service agreement and a token in response to the request and storing the service agreement in the shared repository, wherein the service agreement specifies restrictions of the token including a number of images associated with the token in a range of 30-100 images, token size, object composition for tokens;
   the enterprise computing environment receiving incoming internet protocol packets via the firewall;
   the enterprise computing environment obtaining, from the shared repository, a classifier for predefined images inserted into the token;
   the enterprise computing environment inspecting incoming internet protocol packets received from the firewall by:
      determining if the internet protocol packets contain a token; and
      for the packets containing a token, comparing the classifier to the token to determine whether the token includes the predefined images and meet the restrictions of the service agreement;
   the enterprise computing environment allowing incoming internet protocol packets which contain the token with the predefined images to pass into the enterprise computing environment from secure provider environment, granting access of the secure provider environment to the enterprise computing environment.

8. The method of claim 7, wherein the shared repository includes blockchain.

9. The method of claim 7, wherein the service agreement includes at least one restriction selected from a group consisting of one or more of a combination of: a time of access by the enterprise computing environment by the service provider, access ports of the firewall, number of concurrent access ports of the firewall which can be used, and number of times a token can be used by the service provider.

10. The method of claim 7, wherein the classifier is a neural network classifier.

11. The method of claim 7, wherein the token is greater than 6 megabytes in size.

12. The method of claim 7, wherein the incoming internet protocol packets are inspected at the firewall of the enterprise computing environment.

13. The method of claim 7, wherein the incoming internet protocol packets are inspected by a filter within the enterprise computing environment, after passing through an open port of the firewall.

14. The method of claim 7, wherein the enterprise computing environment and the service provider environment are nodes of a cloud computing environment.

15. A computer program product for securely accessing a secure enterprise computing environment connected to a network through a firewall by a service provider environment, with the secure enterprise computing environment and the service provider environment sharing a shared repository, the service provider environment and the secure enterprise computing environment each comprising a computer comprising at least one processor, one or more memories, one or more computer readable storage media, the computer program product comprising a computer readable storage medium having program instructions embodied therewith, the program instructions executable by the computer to perform a method comprising:

sending, by the service provider environment, a request to the shared repository to access the enterprise computing environment;

receiving, by the service provider environment, a service agreement from the enterprise computing environment specifying requirements of accessing the enterprise computing environment and a token, wherein the service agreement specifies restrictions of the token including a number of images associated with the token in a range of 30-100 images, token size, and object composition for tokens;

adding, by the service provider environment, predefined images to the token based on the service agreement;

storing, by the service provider environment, a classifier for the predefined images inserted into the token created, in the shared repository of the service provider environment and the secure enterprise computing environment;

embedding, by the service provider environment, the token into internet protocol packets; and sending, by the service provider environment, the internet protocol packets with the embedded tokens to the firewall of the enterprise environment according to the service agreement.

16. The computer program product of claim 15, wherein the shared repository includes blockchain.

17. The computer program product of claim 15, wherein the service agreement includes at least one restriction selected from a group consisting of one or more of a combination of: a time of access by the enterprise computing environment by the service provider, access ports of the firewall, number of concurrent access ports of the firewall which can be used, and number of times a token can be used by the service provider.

18. The computer program product of claim 15, wherein the classifier is a neural network classifier.

19. The computer program product of claim 15, wherein the token is greater than 6 megabytes in size.

\* \* \* \* \*